(12) United States Patent
Rooy

(10) Patent No.: US 7,170,554 B2
(45) Date of Patent: Jan. 30, 2007

(54) METHOD FOR PROCESSING SIGNALS REPRESENTING COLOR PICTURES

(75) Inventor: Jan Van Rooy, s-Hertogenbosch (NL)

(73) Assignee: Thomson Licensing, Boulogne-Billancourt (FR)

( * ) Notice: Subject to any disclaimer, the term of this patent is extended or adjusted under 35 U.S.C. 154(b) by 772 days.

(21) Appl. No.: 10/445,480

(22) Filed: May 27, 2003

(65) Prior Publication Data

US 2003/0223000 A1    Dec. 4, 2003

(30) Foreign Application Priority Data

May 28, 2002 (EP) .................................. 02291302

(51) Int. Cl.
  *H04N 9/73* (2006.01)
  *G06K 9/00* (2006.01)
(52) U.S. Cl. .................... 348/223.1; 382/162; 348/655
(58) Field of Classification Search ............ 348/223.1, 348/272, 230.1, 262, 265, 229.1, 222.1, 655; 358/516, 518; 382/167, 162
See application file for complete search history.

(56) References Cited

U.S. PATENT DOCUMENTS

| 5,014,328 | A | * | 5/1991 | Rudak ......................... 382/163 |
| 5,541,653 | A | * | 7/1996 | Peters et al. ................. 348/264 |
| 2001/0048476 | A1 | * | 12/2001 | Nakamura et al. .......... 348/252 |

OTHER PUBLICATIONS

EPO Search Report.

* cited by examiner

Primary Examiner—Shanon A. Foley
Assistant Examiner—Tuan H. Le
(74) Attorney, Agent, or Firm—Joseph J. Laks; Robert B. Levy; Jorge Tony Villabon

(57) ABSTRACT

A method for processing at least a part of a color picture comprises at least one pixel defined by a plurality of color values. Each color value is variable between black and a color clip value. The method comprises, determining for each color value the quantity of the color value above the common clip value, computing a linear combination of the quantities, and for at least one of the color values, outputting a processed color value based on the linear combination.

8 Claims, 1 Drawing Sheet

METHOD FOR PROCESSING SIGNALS REPRESENTING COLOR PICTURES

This application claims benefit, under 35 U.S.C. 119, of European Patent Office Application no. 02291302.4 filed May 28, 2002.

FIELD OF THE INVENTION

The invention relates to a method for processing signals representing colour pictures.

BACKGROUND OF THE INVENTION

It is current practice for cameras to use 3 CCD arrays to capture a colour picture. Each array senses the picture through a given colour filter. The 3 colours which are commonly used for this purpose are red (R), green (G), and blue (B).

Each CCD array outputs a video signal carrying information about the light received by each of its pixels. The 3 video signals are then generally digitised and put together as a digital stream.

The light received by such a camera from a given direction is thus defined by 3 colour values, for instance between 0 and 4,095 if coded on 12 bits. These data are then further processed to get a usable video stream. The further processing steps can take place either in the camera itself or in a studio.

One of these processing steps is applying a white balance. The goal of the white balance is to determine the weight of the various colours to get a picture with a desired look, generally as natural as possible. Typically white balance is performed by imaging a white reference surface which is illuminated with light of a specific colour temperature. The gain of each colour is adjusted until an image of the white reference surface is deemed to be white, i.e. non-coloured and substantially as viewed when illuminated with the specific colour temperature. It consists in applying a gain specific to the colour to each colour value.

As the range within which colour values out of CCD arrays vary is common to the 3 colours whereas the gains for white balance are generally different (depending on the colour), the range of colour values after white balance is specific to each colour.

Differently said, the maximum value (corresponding to saturation of the CCD array and generally called clipping level) after white balance is generally different for the various colours.

Due to this difference, which can be important (e.g. a gain of 14 for red, 5 for green and 8 for blue), a big part of the dynamic range (after white balance) from the colours with highest clipping level remains unused.

SUMMARY OF THE INVENTION

An advantageous arrangement makes better use of the dynamic range available in colour values from CCD imagers to improve the dynamic range of the camera in highlight conditions.

In an inventive method for processing at least a part of a colour picture comprising at least one pixel defined by a plurality of colour values, each colour value being variable between black and a colour clip value. The method employs the steps of, determining the lowest of the colour clip values as common clip value, determining for each colour value the quantity of the colour value above the common clip value, computing a linear combination of the quantities. For at least one of the colour values, outputting as processed colour value, the colour value plus the linear combination if the colour value is below the common clip value and the common clip value plus the linear combination if the colour value is above the common clip value.

According to a possible solution, the method applies to each colour value.

According to another possible solution, the method applies to the green value only, whereas the red value and blue value remain untouched.

According to a preferred embodiment, the linear combination is a mean value of the quantities.

Further features of the invention will appear in the following description of exemplary embodiments.

BRIEF DESCRIPTION OF THE DRAWINGS

The single FIGURE block diagram shows a processing arrangement including various inventive arrangements.

DETAILED DESCRIPTION OF PREFERED EMBODIMENTS

Figure 1:
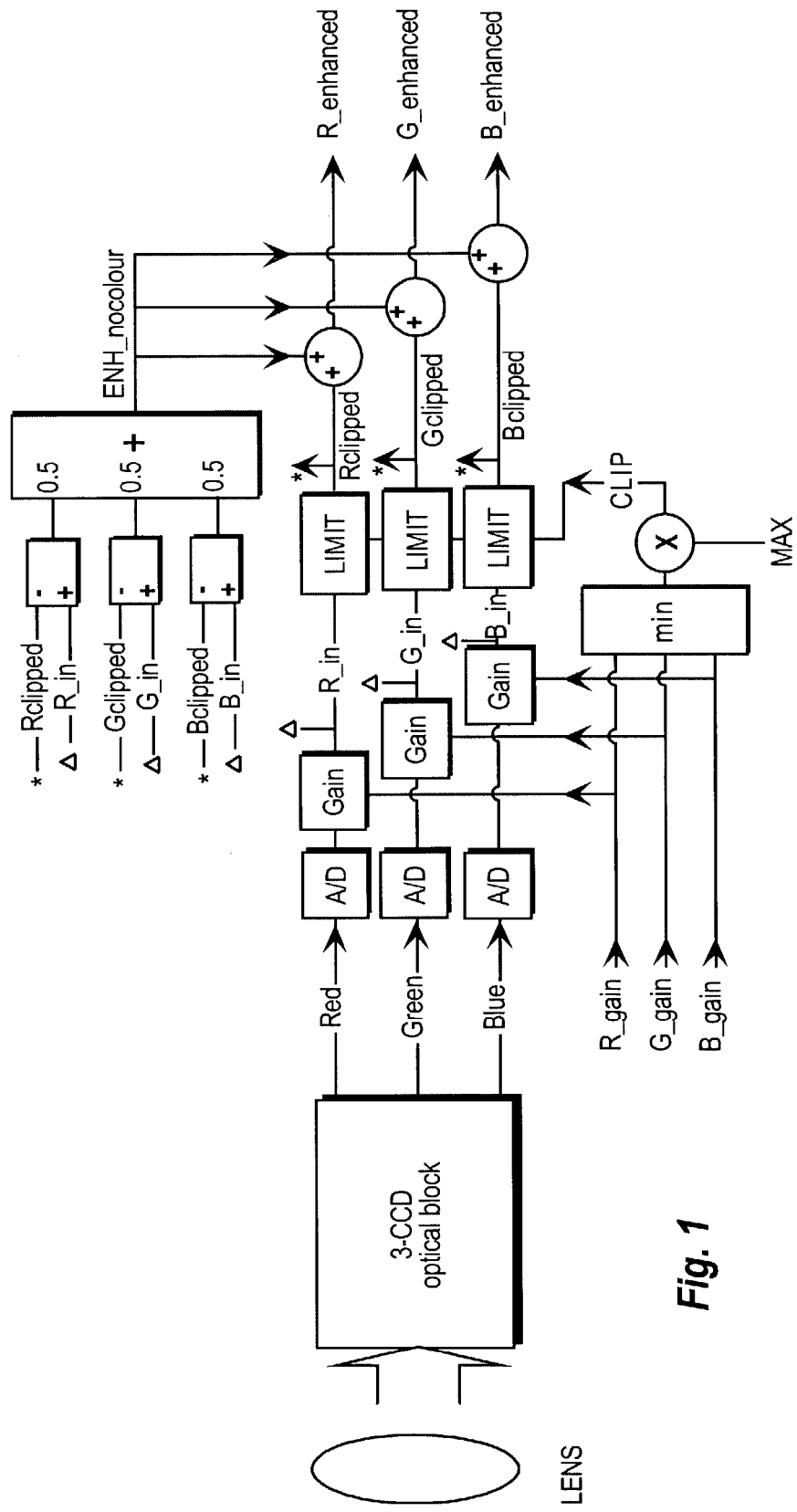

The exemplary inventive arrangement of FIG. 1 generally applies to colour values $(R_{in}, G_{in}, B_{in})_{i,j}$ defining pixels (i, j) after a white balance. The block diagram of FIG. 1 shows a processing arrangement including various inventive arrangements. Sensor signals, Red, Green and Blue are converted to digital words having a maximum common output level of MAX=2^N −1 for an N-bit analog to digital converter with, for example, a resolution of 12 bits. The gain of each colour is adjusted to achieve a white balance condition in response to respective signals R_gain, G_gain and Blue_gain derived, as is known, from manual or automatic settings. The individual gain adjustment for white balance may be represented by, Rmax=MAX*Gain_Red, Gmax=MAX*Gain_Green, Bmax=MAX*Gain_Blue The channel with the lowest gain automatically has the common clip value:

CLIP=MAX*min(Gain_Red, Gain_Green, Gain_Blue), this is a special case of the more generalised formula which follows where CLIP=min(Rmax, Gmax, Bmax)

A clipping signal is formed and applied to each colour at respective limiting blocks and advantageously a non-coloured enhancement signal, ENH_nocolour, is formed with contributions from each colour that has a value that exceeds the clipping value.

If values output by CCD arrays for pixel (i, j) and digitised are called $(R_{CCD}, G_{CCD}, B_{CCD})_{i,j}$, the effect of the white balance for each pixel (i, j) can be written as:

$(R_{in})_{i,j} = R_{gain} \cdot (R_{CCD})_{i,j}$ $(G_{in})_{i,j} = G_{gain} \cdot (G_{CCD})_{i,j}$ $(B_{in})_{i,j} = B_{gain} \cdot (B_{CCD})_{i,j}$.

For instance, $R_{gain}=14$, $G_{gain}=5$ and $B_{gain}=8$ can be used.

Each value $(R_{CCD})_{i,j}$, $(G_{CCD})_{i,j}$ and $(B_{CCD})_{i,j}$ is for instance coded on 12 bits and can consequently take values between 0 and 4095. These values can be directly output from the CCD arrays, but they can also be retrieved from a recording of the raw data output from the CCD arrays. In this last case, a transfer curve can be applied at recording (to get only values of 10 bits on the recording medium); the inverse transfer curve is then applied at retrieval.

The limiting levels for each colour, called hereafter colour clip value, are thus:

$$R_{max}=R_{gain} \cdot 4095$$

$$G_{max}=G_{gain} \cdot 4095$$

$$B_{max}=B_{gain} \cdot 4095.$$

It is clear from above that $R_{max}$, $G_{max}$ and $B_{max}$ are generally different from one another.

The minimum of theses clip levels or colour clip values will be called herebelow common clip value and is thus defined as:

$$CLIP=\min(R_{max},G_{max},B_{max}).$$

Above this common clip value CLIP, the colour information becomes unreliable.

The information above the common clip value CLIP is used as colourless enhancement signal as described below.

In a first embodiment of the method, the processed colour values $(R_{enhanced})_{i,j}$, $(G_{enhanced})_{i,j}$ and $(B_{enhanced})_{i,j}$ for each pixel (i, j) are computed as follows from the colour values output by the white balance step.

If $(R_{in})_{i,j}$<CLIP then $(R_{clipped})_{i,j}=(R_{in})_{i,j}$ else $(R_{clipped})_{i,j}=$CLIP.

If $(G_{in})_{i,j}$<CLIP then $(G_{clipped})_{i,j}=(G_{in})_{i,j}$ else $(G_{clipped})_{i,j}=$CLIP.

If $(B_{in})_{i,j}$<CLIP then $(B_{clipped})_{i,j}=(B_{in})_{i,j}$ else $(B_{clipped})_{i,j}=$CLIP.

The values $(R_{clipped})_{i,j}$, $(G_{clipped})_{i,j}$ and $(B_{clipped})_{i,j}$ can be called the clipped RGB data.

The colourless enhancement signal for each pixel is a linear combination:

$$(ENH\_nocolour)_{i,j}=0.5\cdot\{(R_{in\ i,j}-R_{clipped\ i,j})+(G_{in\ i,j}-G_{clipped\ i,j})+(B_{in\ i,j}-B_{clipped\ i,j})\}.$$

For each pixel, the colourless enhancement signal $(ENH\_nocolour)_{i,j}$ is added to the clipped RGB signal to obtain the processed (and enhanced) colours values $$(R_{enhanced})_{i,j}=(R_{clipped})_{i,j}+(ENH\_nocolour)_{i,j}$$

$$(G_{enhanced})_{i,j}=(G_{clipped})_{i,j}+(ENH\_nocolour)_{i,j}$$

$$(B_{enhanced})_{i,j}=(B_{clipped})_{i,j}+(ENH\_nocolour)_{i,j}.$$

Clearly, the colourless enhancement signal $(ENH\_nocolour)_{i,j}$ allows the colours with low clipping level (green and blue in the above example) to take higher values than the colour clip level, which results in an increase in the dynamic range.

The processed colour values can then be used $(R_{enhanced})_{i,j}$, $(G_{enhanced})_{i,j}$ and $(B_{enhanced})_{i,j}$ instead of the colour values $(R_{in}, G_{in}, B_{in})_{i,j}$ for further processing.

The second embodiment of the method described below is particularly adapted to pictures representing blue sky with clouds. The difference between blue sky and white clouds is basically a modulation in the red signal. To maintain the blue sky we only compensate for the lack of green signal caused by clipping in the green channel. Using the colourless enhancement signal proposed above, the processed colour values in this embodiment are:

$$(R_{enhanced})_{i,j}=(R_{in})_{i,j}$$

$$(G_{enhanced})_{i,j}=(G_{clipped})_{i,j}+(ENH\_nocolour)_{i,j}$$

$$(B_{enhanced})_{i,j}=(B_{in})_{i,j}.$$

The green signal only is corrected; red and blue signals remain untouched.

As previously, by increasing the dynamic range of the green signal after processing, the dynamic range of the camera as a whole is improved.

What is claimed is:

1. A method for processing at least a part of a colour picture comprising at least one pixel defined by a plurality of colour values, each colour value being variable between black and a colour clip value, with the following steps:

determining the lowest of the colour clip values as common clip value, determining for each colour value the quantity of the colour value above the common clip value, computing a linear combination of said quantities, for at least one of the colour values, outputting as processed colour value;

the colour value plus said linear combination if said colour value is below the common clip value;

the common clip value plus said linear combination if said colour value is above the common clip value.

2. A method according to claim 1, with the steps of:

outputting as processed colour value for each colour value;

the colour value plus said linear combination if said colour value is below the common clip value;

the common clip value plus said linear combination if said colour value is above the common clip value.

3. A method according to claim 1, wherein said colour values are a red value, a green value and blue value, with the steps of:

outputting as processed green value;

the green value plus said linear combination if said green value is below the common clip value;

the common clip value plus said linear combination if said green value is above the common clip value;

outputting the red value as processed red value;

outputting the blue value as processed blue value.

4. A method according to claim 1, wherein said linear combination is a mean value of said quantities.

5. A method according to claim 1, wherein said colour values are generated in a white balance step.

6. A method according to claim 1, with the step of:

digitising signals from CCD arrays and applying a white balance thereto to generate the colour values.

7. A method according to claim 1, wherein the colour values are retrieved from a previous recording.

8. A method according to claim 7, wherein an inverse transfer curve is applied to generate the colour values.

* * * * *